United States Patent [19]
Sakakibara

[11] Patent Number: 5,653,604
[45] Date of Patent: Aug. 5, 1997

[54] APPARATUS FOR ELECTRICALLY INTERCONNECTING PARTS ON THE STEERING WHEEL AND COLUMN OF A MOTOR VEHICLE

[75] Inventor: Takeshi Sakakibara, Shizuoka-ken, Japan

[73] Assignee: Yazaki Corporation, Tokyo, Japan

[21] Appl. No.: 575,867

[22] Filed: Dec. 20, 1995

[30] Foreign Application Priority Data

Dec. 22, 1994 [JP] Japan ................... 6-319981

[51] Int. Cl.⁶ ............................... H01R 35/00
[52] U.S. Cl. .......................... 439/164; 439/15
[58] Field of Search ................. 439/164, 15, 16

[56] References Cited

U.S. PATENT DOCUMENTS 5,259,775  11/1993  Kubota et al. ................. 439/15
5,314,344  5/1994  Ida et al. ..................... 439/164
5,328,112  7/1994  Obata ......................... 439/15

FOREIGN PATENT DOCUMENTS 004419077  12/1994  European Pat. Off. ........... 439/164

*Primary Examiner*—Neil Abrams
*Assistant Examiner*—Eugene G. Byrd
*Attorney, Agent, or Firm*—Finnegan, Henderson, Farabow, Garrett & Dunner, L.L.P.

[57] ABSTRACT

Disclosed herein is an apparatus for electrically interconnecting parts on the steering wheel and column, respectively, of a motor vehicle by interconnecting an under cover, which is fixed to the column, and a rotator, which is fixed to the wheel so as to rotate relatively to the under cover as the wheel rotates, through a long flexible flat cable with its intermediate portion housed between the under cover and the rotator. The under cover has a junction. Fixed to the under cover is an internal gear having a positioner integral with it. The positioner is inserted into the junction so as to position the internal gear relatively to the under cover.

4 Claims, 3 Drawing Sheets

APPARATUS FOR ELECTRICALLY INTERCONNECTING PARTS ON THE STEERING WHEEL AND COLUMN OF A MOTOR VEHICLE

BACKGROUND OF THE INVENTION

1. Field of the Invention

The present invention relates to apparatus for electrically interconnecting parts on the steering wheel and column, respectively, of a motor vehicle.

2. Description of the Prior Art

In recent years, as automobiles have been electronically controlled, electronic control switches have been fitted on the steering wheels of steering device of automobiles. It is necessary to electrically wire the switches to parts on the steering columns. The steering wheels can rotate more than 360° in both directions. In order to electrically interconnect parts on the steering wheel shaft and the steering column of an automobile, there is a need of an apparatus including a rotating body fixed to the shaft, a fixed body fixed to the column, and a flexible flat cable (which will be referred hereinafter to as an FFC), which generally has plural lead wires, housed between the bodies. The FFC may be either vortically wound or vortical and turned back midway.

In general, such an apparatus includes a first rotator and a second rotator, as rotating cylindrical bodies, which surround and are fixed to the steering wheel shaft of an automobile, and an upper cover and an under cover, as fixed cylindrical bodies, which rotatably support the peripheries of the rotating bodies and are fixed to the steering column. An annular space is formed between the rotating bodies and the fixed bodies. Housed in the space is a FFC for electrically interconnecting parts on the steering wheel and column.

In general, the under cover has an upward opening cylindrical wall. Fitted inside the cylindrical wall is an internal gear slightly smaller in diameter than the inner diameter of the wall. The internal gear has ribs projecting from its outer periphery for positioning it and preventing it from rotating. The ribs are spaced at different angles circumferentially of the internal gear. The under cover has inner recesses in its cylindrical wall. Each of the ribs engages with one of the recesses.

Because the ribs are spaced circumferentially at different angles, the internal gear can be positioned uniquely in place and prevented from rotating relatively to the under cover.

In fitting the internal gear inside the cylindrical wall of the under cover, however, the internal gear is positioned relatively to the cover by engaging the ribs, which are spaced at different angles, with the recesses, so that it is difficult to determine the position and wrong positioning may occur. As a result, there is a need of a process for inspecting the positioning of the internal gear, or a process for correcting its position, so that the production costs are high.

In addition, the ribs engage with or lap over the recesses in a small amount. Therefore, when the FFC has reached its critical position of rotation, i.e., if the first rotator is rotated further after the FFC is all wound on the rotator, the FFC is pulled, so that torque is exerted on the internal gear. As a result, the ribs may disengage from the recesses, so that the internal gear rotates relatively to the under cover. Thus, the strength of the ribs and recesses is not enough to position or fix the internal gear relatively to the under cover.

SUMMARY OF THE INVENTION

It is the object of this invention to provide an electrically connecting apparatus of the type mentioned above, which can completely prevent the internal gear from being wrongly fitted to the fixed bodies, and can completely fix the internal gear to the bodies.

In order to achieve the above mentioned object, the present invention provides an apparatus for electrically interconnecting parts on the steering wheel and column, respectively, of a motor vehicle includes a fixed body and a rotating body. The fixed body is fixed to the column and has a junction. The junction projects outward radially with and inside said fixed body. The rotating body is fixed to the wheel so as to rotate relatively to the fixed body as the wheel rotates. The rotating body has external gear teeth. One end of a flexible flat cable is fixed to the junction of the fixed body; the other end is fixed to the rotating body. An intermediate portion of the cable is housed in the space between the fixed and rotating bodies. An internal gear is fitted to the fixed body coaxially therewith. An annular carrier is supported rotatably by and between the internal gear and the rotating body and coaxially therewith. A guide roller is supported rotatably on one side of and by the carrier eccentrically therefrom. The guide roller is located in the space so as to guide the cable as the carrier rotates. A planetary gear is supported rotatably on the other side of and by the carrier eccentrically therefrom. The planetary gear engages with the internal gear and the external gear teeth of the rotating body so as to move in the same direction as the rotating body rotates, thereby rotating the carrier in the direction. The cable moves in the space as the rotating body rotates in either direction. Positioning means is formed integrally with the internal gear and inserted into the junction of the fixed body so as to position the internal gear relatively to the fixed body.

According to the present invention, in fitting the internal gear to the fixed body, the internal gear is positioned relatively to the body by inserting the internal gear positioning means into the fixed body junction. If the internal gear is fitted to the fixed body with the positioning means engaging with the junction, the internal gear is prevented from rotating relatively to the fixed body. By inserting the positioning means into the junction, the internal gear can be easily positioned relatively to the fixed body, and prevented from being wrongly fitted.

According to an aspect of the present invention, the fixed body may be an under cover having a cylindrical wall, which partially extends outward so as to form the junction. The internal gear may have a cylindrical wall, which is fitted inside the cylindrical wall of the undercover, and from which the positioning means projects outward.

According to the present invention, by inserting the cylindrical wall of the internal gear into the cylindrical wall of the fixed body, the internal gear can be fitted to the body. In doing so, the internal gear can be positioned relatively to the fixed body by inserting the positioning means into the junction.

According to an aspect of the present invention, a connector may be fixed to the one end of the cable. The internal gear positioning means may include positioning ribs for positioning the internal gear relatively to the fixed body. The positioning means may also include stabilizing ribs for holding the connector to the fixed body junction.

According to the present invention, by inserting the positioning means into the junction, the internal gear can be positioned in place on the fixed body. The positioning ribs position the internal gear relatively to the body, while the stabilizing ribs hold the connector in the junction so as to prevent the connector from being loose.

The nature, principle and utility of the invention will become more apparent from the following detailed description when read in conjunction with the accompanying drawings.

BRIEF DESCRIPTION OF THE DRAWINGS

A preferred embodiment of the present invention is described below with reference to the accompanying drawings, in which.

DESCRIPTION OF THE PREFERRED EMBODIMENT

Description will be made hereinafter in conjunction with the embodiment of the present invention with reference to the drawings.

Figure 1:
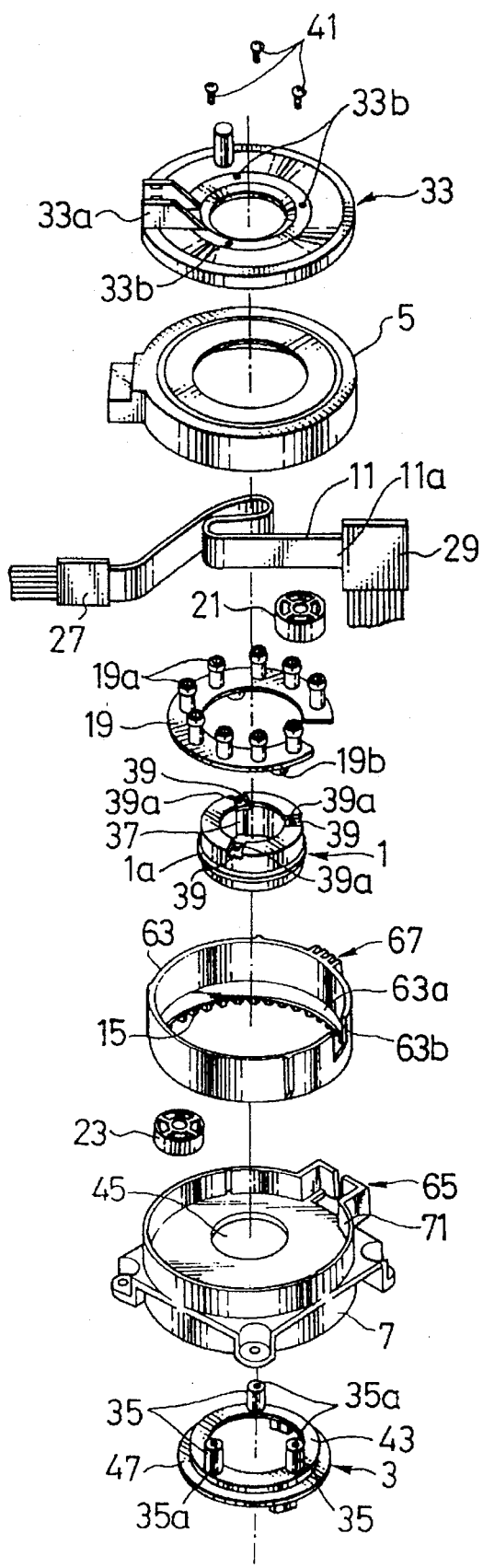
FIG. 1 is an exploded view of an apparatus according to the invention for electrically interconnecting parts on the steering wheel and column of a car.

FIG. 1 is an exploded view of an apparatus according to the invention for electrically interconnecting parts on the steering wheel and column of a car.

With reference to FIG. 1, the apparatus includes rotating cylindrical bodies, which surround and are fixed to the steering wheel shaft of a car, and fixed cylindrical bodies, on the peripheries of which the rotating bodies are supported rotatably, and which are fixed to the steering column (not illustrated). The rotating bodies include a first rotator 1 and a second rotator 3. The fixed bodies include an upper cover 5 and an under cover 7. Housed in the annular space 9 between the rotating and fixed bodies is a FFC 11 for electric connection between the steering wheel and column.

Fixed in the fixed bodies, which are the upper cover 5 and the under cover 7, is an internal gear 63 for housing the FFC 11. The internal gear 63 has teeth 15 formed on the inner periphery of its bottom, and a lower inner flange 63a over the teeth. The first rotator 1 has a lower outer flange 1a. Relatively rotatably mounted between the flanges 1a and 63a is a carrier 19, which has pins 19a upward extending. Rotatably supported on each pin 19a is a guide roller 21 for guiding the FFC 11.

The carrier 19 also has three pins 19b downward extending. Rotatably supported on each pin 19b is a planetary gear 23 for engagement with the internal gear teeth 15. The first rotator 1 has external gear teeth (not shown) formed near the bottom for engagement with the planetary gears 23. The first rotator 1 rotates the planetary gears 23, which then revolve along the internal gear teeth 15. The revolution of planetary gears 23 rotates the carrier 19 relatively to the first rotator 1 at a specified reduction ratio.

Figure 3:
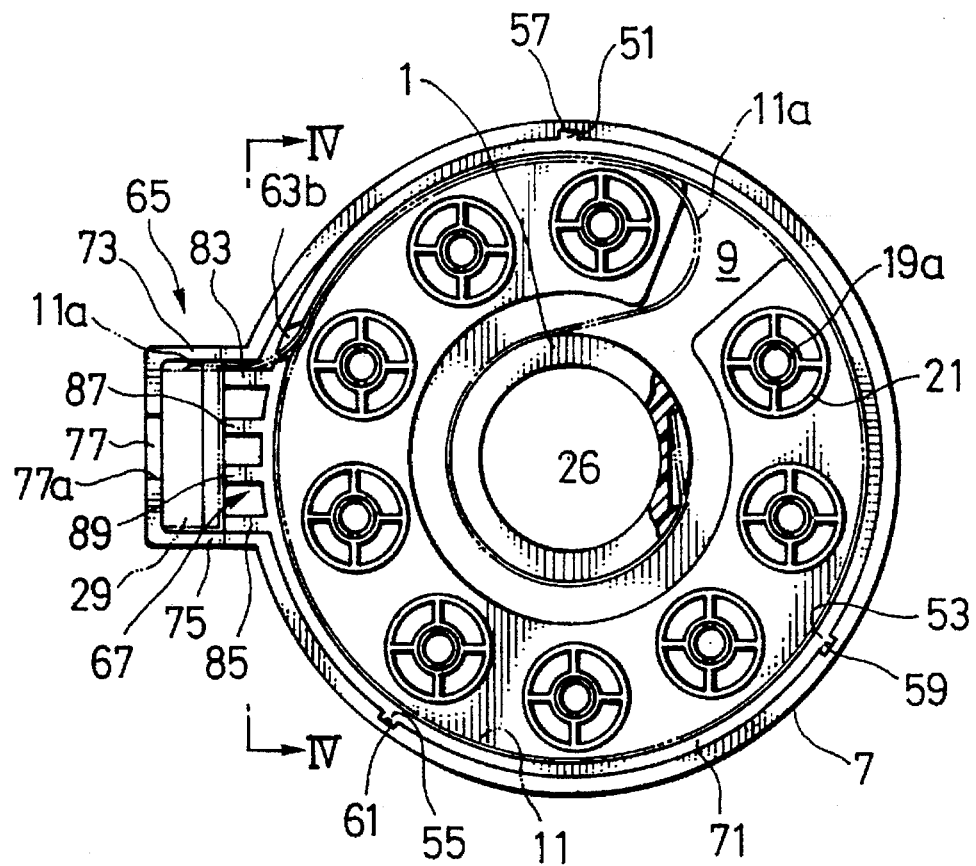
FIG. 3 is a top plan view with the FFC housed in the apparatus according to an embodiment of the present invention.

As shown by a broken line in FIG. 3, the inner end of FFC 11 is fixed to the fixture 26 of first rotator 1. The tip of this end is fixed to a connector 27. In FIG. 3, the internal gear 63 is not shown. The FFC 11 extends from the connector 27 and around the outer periphery of first rotator 1, forms a curve 11a turning around one of guide rollers 21, and further extends in the reverse direction along the inner periphery of internal gear 63 and out of the internal gear 63 through the notch 63b. The outer end of FFC 11 is connected to a connector 29, which is fixed to the junction 31 of under cover 7.

Positioned over the upper cover 5, as shown in FIG. 1, is a rotating cover 33 which rotates with the rotators 1 and 3. This cover 33 has a fixture 33a formed on it, to which the connector 27 on the inner end of FFC 11 is fixed. The cover 33 has three screw holes 33b formed through it. The second rotator 3 has three bosses 35 projecting from its top surface. The bosses 35 correspond with the holes 33b and each have a tapped hole 35a formed in their top ends. The first rotator 1 has three axial grooves 37 formed in its inner periphery and extending upward from its bottom. Each boss 35 engages with one groove 37. The first rotator 1 has an upper inner flange 39 over the grooves 37. The bottom of flange 39 contacts with the tops of bosses 35. The flange 39 has three axial screw holes 39a formed through it. A screw 41 extends through each hole 33b of rotating cover 33 and each hole 39a of first rotator 1, and engages into each hole 35a of second rotator 3 to fix the rotating and fixed bodies together.

The FFC 11 has such a length that it can follow the rotations of the steering wheel. As the first rotator 1 rotates clockwise in FIG. 3, the cable portion wound around the first rotator 1 is rewound and loosened, and then wound on the inner periphery of internal gear 63. If the first rotator 1 rotates counterclockwise in FIG. 3, the portion of FFC 11 wound on the inner periphery of internal gear 63 is loosened, and then gradually wound around the first rotator 1. Interposed between the cable portions on the first rotator side and the internal gear side are the guide rollers 21, which can rotate in contact with the FFC 11. As a result, the FFC 11 can move at the same speed as the carrier 19 smoothly without frictional resistance.

The second rotator 3 has an annular part 43. The under cover 7 has a through hole 45, into which the annular part 43 is inserted from below. The second rotator 3 also has an outer flange 47 below the annular part 43. The flange 47 contacts with the bottom of under cover 7 so that the under cover 7 stops the second rotator 3.

It should be noted in particular that the under cover 7 has a junction 65, and that the internal gear 63 has a positioner 67 integral with it. The positioner 67 is inserted into the junction 65 to position the internal gear 63 relatively to the under cover 7.

Figure 2:
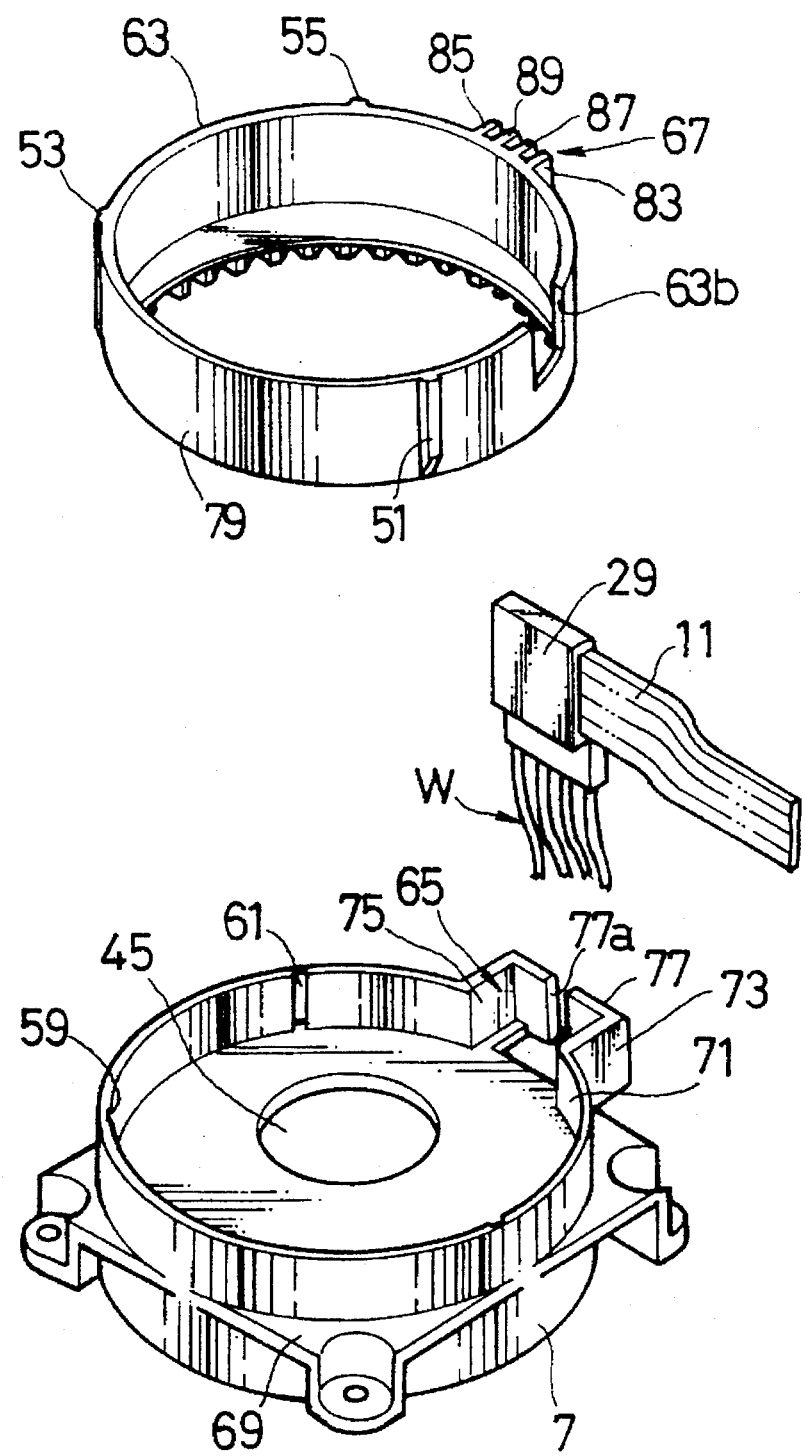
FIG. 2 is an exploded view showing on an enlarged scale the internal gear and the under cover of FIG. 1.

As shown in FIGS. 2 and 3, the under cover 7 has a main body 69 and a cylindrical wall 71 on the body. Part of wall 71 extends outward and forms a pair of side walls 73 and 75, which are bridged by an outer wall 77 so as to form the rectangular junction 65. Therefore, the interior of cylindrical wall 71, in which the internal gear 63 is put, communicates with the junction 65. The outer wall 77 has a slit 77a. The connector 29 on the FFC 11 is fitted in the junction 65 and fixed by the upper cover 5. Connected to the connector 29 are electric wires W, which extend outward through the slit 77a.

The internal gear 63 includes a cylindrical wall 79, which is put within the cylindrical wall 71 of under cover 7. The positioner 67 projects from the outer surface of wall 79. When the cylindrical wall 79 is put within the cylindrical wall 71, the positioner 67 is inserted into the junction 65. The positioner 67 includes a pair of positioning ribs 83 and 85, which are spaced a distance nearly equal to the width of junction 65, and a pair of connector stabilizing ribs 87 and 89 between the positioning ribs 83 and 85. The positioning ribs 83 and 85, the connector stabilizing ribs 87 and 89 extend axially of the cylindrical wall 79, and are spaced at specified intervals. In FIGS. 2 and 3, a reference numeral 63b indicates a notch for use in running the FFC 11 from inside the internal gear 63.

Figure 4:
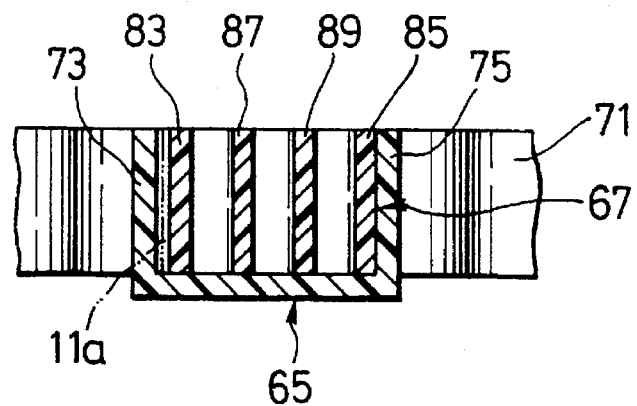
FIG. 4 is a cross-sectional view taken along line IV—IV of FIG. 3.

As shown in FIGS. 3 and 4, with the positioning ribs 83, 85 and the connector stabilizing ribs 87 and 89 put within the junction 65, the positioning ribs 83 and 85 are placed between the opening edges, or the side walls 73 and 75 of junction 65. The stabilizing ribs 87 and 89 press the connector 29 outward, or toward the outer wall 77. Between the positioning rib 83 and the side wall 73, there is a clearance through which an end portion 11a of FFC 11 extends. The other positioning rib 85 contacts compressively with the side wall 75.

In mounting the internal gear 63 on the under cover 7, the internal gear 63 is inserted into the cylindrical wall 71, with the positioner 67 aligned with the junction 65. Next, the connector 29 of the FFC 11 is put between the outer wall 77 of junction 65, and the positioning ribs 83 and 85 and the connector stabilizing ribs 87 and 89. The end portion 11a of the FFC 11 is passed between the positioning rib 83 and the side wall 73, then between the cylindrical walls 71 and 79, and into the interior of cylindrical wall 79 of internal gear 63 through the slit 63b.

Thus, by simply inserting the positioner 67 into the junction 65, the internal gear 63 can be easily positioned relatively to the under cover 7, so that wrong mounting is completely prevented. As a result, there is no need of processes for inspecting the mounting and for correcting wrong mounting, so that the production costs are reduced.

Because the positioning ribs 83 and 85 lap over the junction side walls 73 and 75 in a large amount, it is possible to completely position the internal gear 63 with respect to the under cover 7, and completely prevent this internal gear from rotating.

When the internal gear positioner 67 is inserted into the junction 65, the connector 29 of the FFC 11 fitted into the junction 65 is pushed toward the outer wall 77. As a result, the connector 29 is completely prevented from being loose within the junction 65.

It should be understood that many modifications and adaptations of the invention will become apparent to those skilled in the art and it is intended to encompass such obvious modifications and changes in the scope of the claims appended hereto.

What is claimed is:

1. An apparatus for electrically interconnecting the steering wheel and column, respectively, of a motor vehicle, said apparatus comprising:

a fixed body fixed to said column and having a junction, which projects outward radially of said fixed body;

a rotating body fixed to said wheel coaxially with and inside said fixed body so as to rotate relatively to said fixed body as said wheel rotates, said rotating body having external gear teeth;

a flexible flat cable, one end of which is fixed to said junction of the fixed body, the other end being fixed to said rotating body, and an intermediate portion of which is housed in a space between said fixed and rotating bodies;

an internal gear fitted to said fixed body coaxially therewith;

an annular carrier supported rotatably by and between said internal gear and said rotating body and coaxially therewith;

a guide roller supported rotatably on one side of and by said carrier eccentrically therefrom, said roller being located in said space so as to guide said flat cable as said carrier rotates; and a planetary gear supported rotatably on the other side of and by said carrier eccentrically therefrom, said planetary gear engaging with said internal gear and said external gear teeth of the rotating body so as to move in the same direction as said rotating body rotates, thereby rotating said carrier in said direction;

such that said flat cable moves in said space as said rotating body rotates in either direction;

said apparatus being characterized in that positioning means is formed integrally with said internal gear and inserted into said junction of the fixed body to position said internal gear relatively to said fixed body.

2. The apparatus of claim 1, wherein:

said fixed body comprises an under cover having a cylindrical wall, which partially extends outward so as to form said junction, said internal gear having a cylindrical wall, which is fitted inside said cylindrical wall, and from which said positioning means projects outward.

3. The apparatus of claim 1, wherein:

said positioning means comprises positioning ribs for positioning said internal gear relatively to said fixed body and stabilizing ribs for holding a connector fixed to said one end of the flat cable to said junction of said fixed body.

4. The apparatus of claim 2, wherein:

said positioning means comprises positioning ribs for positioning said internal gear relatively to said fixed body and stabilizing ribs for holding a connector fixed to said one end of the flat cable to said junction of said fixed body.

* * * * *